(12) United States Patent
Ye et al.

(10) Patent No.: US 12,548,817 B2
(45) Date of Patent: Feb. 10, 2026

(54) HEAT MANAGEMENT APPARATUS AND HEAT MANAGEMENT SYSTEM

(71) Applicant: ZHEJIANG SANHUA AUTOMOTIVE COMPONENTS CO., LTD., Zhejiang (CN)

(72) Inventors: Keli Ye, Zhejiang (CN); Bin Song, Zhejiang (CN); Linzhong Wu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 568 days.

(21) Appl. No.: 17/927,983

(22) PCT Filed: May 26, 2021

(86) PCT No.: PCT/CN2021/095900
§ 371 (c)(1),
(2) Date: Nov. 28, 2022

(87) PCT Pub. No.: WO2021/238948
PCT Pub. Date: Dec. 2, 2021

(65) Prior Publication Data
US 2023/0216101 A1    Jul. 6, 2023

(30) Foreign Application Priority Data

May 27, 2020    (CN) .......................... 202010460054.1

(51) Int. Cl.
*H01M 10/613*    (2014.01)
*F16K 1/36*    (2006.01)
(Continued)

(52) U.S. Cl.
CPC ............. *H01M 10/613* (2015.04); *F16K 1/36* (2013.01); *F25B 5/04* (2013.01); *F25B 25/005* (2013.01);
(Continued)

(58) Field of Classification Search
CPC ............. H01M 10/613; H01M 10/625; H01M 10/6556; H01M 10/6567; H01M 10/66;
(Continued)

(56) References Cited

U.S. PATENT DOCUMENTS

2008/0127666 A1    6/2008    Major et al.
2012/0210746 A1    8/2012    Kadle et al.
(Continued)

FOREIGN PATENT DOCUMENTS

CN    102818404 A    12/2012
CN    103370594 A    10/2013
(Continued)

OTHER PUBLICATIONS

Pdf is translation of foreign reference WO 2019026481 A1 (Year: 2019).*

(Continued)

*Primary Examiner* — Eric S Ruppert
*Assistant Examiner* — Kamran Tavakoldavani
(74) *Attorney, Agent, or Firm* — Ohlandt, Greeley and Perle, LLP.

(57) ABSTRACT

A heat management apparatus comprises a first heat exchange portion, a second heat exchange portion and a throttle unit, wherein the first heat exchange portion is used for exchanging heat between a refrigerant throttled by the throttle unit, and a cooling liquid; and a first wall of the first heat exchange portion and a second wall of the second heat (Continued)

exchange portion are arranged opposite each other, such that the structure of the heat management apparatus is relatively compact.

16 Claims, 10 Drawing Sheets

(51) Int. Cl.
| | |
|---|---|
| F25B 5/04 | (2006.01) |
| F25B 25/00 | (2006.01) |
| F25B 39/02 | (2006.01) |
| F25B 41/35 | (2021.01) |
| F25B 41/39 | (2021.01) |
| F28D 9/00 | (2006.01) |
| F28F 3/00 | (2006.01) |
| F28F 9/18 | (2006.01) |
| F28F 9/26 | (2006.01) |
| F28F 11/00 | (2006.01) |
| H01M 10/625 | (2014.01) |

(52) U.S. Cl.
CPC .............. *F25B 39/02* (2013.01); *F25B 41/35* (2021.01); *F25B 41/39* (2021.01); *F28D 9/00* (2013.01); *F28F 3/00* (2013.01); *F28F 9/18* (2013.01); *F28F 9/26* (2013.01); *F28F 11/00* (2013.01); *H01M 10/625* (2015.04); *F25B 2500/18* (2013.01)

(58) Field of Classification Search
CPC .. F16K 1/36; F16K 1/38; F25B 25/005; F25B 39/02; F25B 40/00; F25B 41/35; F25B 41/39; F25B 5/04; F25B 2500/18; F25B 39/022; F28D 9/00; F28D 9/005; F28D 9/0093; F28D 2021/0068; F28F 11/00; F28F 27/02; F28F 3/00; F28F 9/18; F28F 9/26

See application file for complete search history.

(56) References Cited

U.S. PATENT DOCUMENTS

| | | | |
|---|---|---|---|
| 2013/0061584 A1* | 3/2013 | Gerges | ................. F28D 9/0056 165/166 |
| 2015/0184946 A1 | 7/2015 | Barwig et al. | |
| 2018/0080693 A1* | 3/2018 | Wang | ................. H01M 10/625 |
| 2019/0103623 A1 | 4/2019 | Silk et al. | |
| 2020/0070628 A1 | 3/2020 | Tan et al. | |

FOREIGN PATENT DOCUMENTS

| | | | |
|---|---|---|---|
| CN | 104641196 A | 5/2015 | |
| CN | 205245623 U | 5/2016 | |
| CN | 206095009 U | 4/2017 | |
| CN | 106918165 A | 7/2017 | |
| CN | 207113674 U | 3/2018 | |
| CN | 108068581 A | 5/2018 | |
| CN | 108571834 A | 9/2018 | |
| CN | 207994013 U | 10/2018 | |
| DE | 19805285 A1 | 8/1999 | |
| WO | WO-2019026481 A1 * | 2/2019 | ............... F25B 1/00 |

OTHER PUBLICATIONS

European Search Report dated May 24, 2024 for European Application No. 21813291.8.
International Search Report dated Apr. 16, 2021 for PCT Appl. No. PCT/CN2021/077996.
Chinese Office Action dated Nov. 29, 2024 for Chinese Application No. 202010460054.1.

* cited by examiner

HEAT MANAGEMENT APPARATUS AND HEAT MANAGEMENT SYSTEM

This application is a National Phase entry of PCT Application No. PCT/CN2021/095900, filed on May 26, 2021, which claims priority of Chinese Patent Application No. 202010460054.1, titled "HEAT MANAGEMENT APPARATUS AND HEAT MANAGEMENT SYSTEM", filed with the China National Intellectual Property Administration on May 27, 2020, which are incorporated herein by reference in their entireties.

FIELD

The present application relates to the technical field of heat management, and in particular to a heat management apparatus and a heat management system.

BACKGROUND

An intermediate heat exchanger, a plate evaporator and an expansion valve in a heat management system are connected through pipelines, or the plate evaporator and the expansion valve are integrated, and the intermediate heat exchanger and the integrated plate evaporator are still connected through the pipelines.

SUMMARY

An object of the present application is to provide a heat management apparatus and a heat management system, which is beneficial to the miniaturization of a structure of the heat management apparatus.

In one aspect, a heat management apparatus is provided according to an embodiment of the present application, which includes a throttle unit and a heat exchange core body, the throttle unit is fixedly connected with the heat exchange core body or connected with the heat exchange core body in a limited position, and the heat exchange core body includes multiple stacked plates; the heat exchange core body includes a first heat exchange portion and a second heat exchange portion, the heat management apparatus includes a refrigerant flow passage and a coolant flow passage, the coolant flow passage is located in the second heat exchange portion, the refrigerant flow passage includes a first flow passage, a second flow passage and a third flow passage, the first flow passage and the second flow passage are located in the first heat exchange portion, the third flow passage is located in the second heat exchange portion, a refrigerant in the first flow passage can exchange heat with a refrigerant in the second flow passage in the first heat exchange portion, a refrigerant in the third flow passage can exchange heat with a coolant in the coolant flow passage in the second heat exchange portion; the first heat exchange portion includes a first wall, the second heat exchange portion includes a second wall, and the first wall is arranged opposite to the second wall; and the throttle unit includes a valve port portion, the valve port portion includes a valve port, the first flow passage is in communication with the third flow passage through the valve port, and the third flow passage is in communication with the second flow passage.

In another aspect, a heat management system is provided according to an embodiment of the present application, which includes a heat management apparatus, a compressor and a condenser, the heat management apparatus is the above heat management apparatus, the heat management apparatus includes a first inlet, a first outlet, a second outlet and a second inlet, an outlet of the compressor is in communication with the first inlet through the condenser, the first outlet is in communication with an inlet of the compressor, the heat management system further includes a first heat exchanger and a pump, and the second outlet of the heat management apparatus is in communication with the second inlet through the first heat exchanger and the pump.

The heat management apparatus and the heat management system provided according to the embodiment of the present application include the first heat exchange portion and the second heat exchange portion, the refrigerant flow passage of the heat management apparatus includes the first flow passage, the second flow passage and the third flow passage, the first flow passage and the second flow passage are located in the first heat exchange portion, the refrigerant in the first flow passage can exchange heat in the first heat exchange portion with the refrigerant in the second flow passage, the third flow passage and the coolant flow passage are located in the second heat exchange portion, the refrigerant in the third flow passage can exchange heat in the second heat exchange portion with the coolant in the coolant flow passage, the first flow passage is in communication with the third flow passage through the valve port of the throttle unit, the third flow passage is in communication with the second flow passage, and the first wall of the first heat exchange portion is arranged opposite to the second wall of the second heat exchange portion, so that the heat management apparatus has a compact structure, which is beneficial to the minimization.

DETAILED DESCRIPTION OF THE EMBODIMENTS

Figure 1:
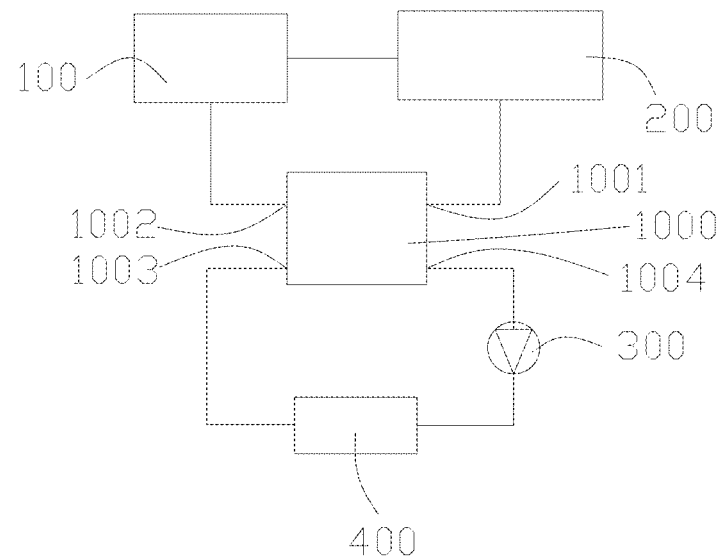
FIG. 1 is a schematic block diagram showing a connection of a heat management system.

A heat management system and a heat management apparatus according to the technical solution of the present application may have various embodiments, at least one of which can be applied to a vehicle heat management system, and at least one of which can be applied to other heat management system including a household heat management system or a commercial heat management system, etc. A heat management system for vehicles and a heat management apparatus for vehicles are described as an example with reference to the drawings hereinafter.

Referring to FIG. 3 to FIG. 11, a heat management apparatus 1000 includes a heat exchange core body 1600 and a throttle unit 1300, the heat exchange core body 1600 includes multiple stacked plates, a first plate body 1140 and a second plate body 1210, and the multiple plates are located between the first plate body 1140 and the second plate body 1210 along a stacking direction of the multiple plates. Specifically, the heat exchange core body 1600 includes a first heat exchange portion 1100, a connecting plate body 1400 and a second heat exchange portion 1200. In this embodiment, the first plate body 1140 is a part of the first heat exchange portion 1100, the second plate body 1210 is a part of the second heat exchange portion 1200, the first heat exchange portion 1100 further includes a top plate, multiple plates of the first heat exchange portion 1100 are stacked from the first plate body 1140 to the top plate. The second heat exchange portion 1200 further includes a bottom plate, and multiple plates of the second heat exchange portion 1200 are stacked from the bottom plate to the second plate body 1210. The connecting plate body 1400 is located between the top plate and the bottom plate, and is fixed to the top plate and the bottom plate by welding. In other embodiments, the heat exchange core body 1600 may not be provided with the top plate and the bottom plate, and the connecting plate body 1400 is directly fixed to the plates of the first heat exchange portion 1100 and the plates of the second heat exchange portion 1200 by welding. It should be noted that, for the convenience of description, it is defined that the second heat exchange portion 1200 is located above the first heat exchange portion 1100. Alternatively, the connecting plate body 1400 may not be provided. The heat exchange core body 1600 has a set of structures, the heat exchange core body 1600 includes the first plate body 1140 and the second plate body 1210, and multiple plates located between the first plate body 1140 and the second plate body 1210 along the stacking direction of the plates. The plates are located between the first plate body 1140 and the second plate body 1210 along the stacking direction of the plates, and multiple plates are stacked from the first plate body 1140 to the second plate body 1210, or in other words, multiple plates are stacked from the second plate body 1210 to the first plate body 1140.

The first heat exchange portion 1100 and the second heat exchange portion 1200 both include multiple stacked plates, the plates of the first heat exchange portion 1100 may have the same structure with the plates of the second heat exchange portion 1200, and the structure of the plates of the first heat exchange portion 1100 are described as an example to describe the structure of the plates. In the first heat exchange portion 1100, a first inter-plate passage and a second inter-plate passage are formed after adjacent plates are stacked. Except for two plates respectively closest to the first plate body 1140 and the top plate, on one side of an inner side plate is the first inter-plate passage and on another side of the inner side plate is the second inter-plate passage. That is, the first inter-plate passage and the second inter-plate passage are located on opposite sides of the same plate. In this embodiment, the adjacent plates have the same structure. For ease of description, one of two adjacent plates is defined as a first plate, the other one is defined as a second plate. For example, if the first inter-plate passage is formed between a first plate and one of two second plates adjacent to the first plate, the second inter-plate passage is formed between the first plate and the other one of the two second plates adjacent to the first plate. The first inter-plate passage is basically not in communication with the second inter-plate passage. A fluid in the first inter-plate passage can exchange heat with a fluid located in the second inter-plate passage. It should be noted that, that the first inter-plate passage is basically not in communication with the second inter-plate passage, means that the first inter-plate passage is not in communication with the second inter-plate passage inside the first heat exchange portion 1100, and there may be a case that the first inter-plate passage is in communication with the second inter-plate passage after the heat management apparatus 1000 becomes a part of the heat management system. A thickness of main body portions of the connecting plate body, the top plate, the bottom plate is larger than a thickness of a main body portion of the plates, which has the function of enhancing the mechanical strength of the heat management apparatus 1000.

The heat management apparatus 1000 includes a refrigerant flow passage, a coolant flow passage, a first inlet 1001, a first outlet 1002, a second inlet 1003 and a second outlet 1004, and the first inlet 1001 is in communication with the first outlet 1002 through the refrigerant flow passage, that is, the first inlet 1001 is an inlet of the refrigerant flow passage, and the first outlet 1002 is an outlet of the refrigerant flow passage; the second inlet 1003 is in communication with the second outlet 1004 through the coolant flow passage, that is, the second inlet 1003 is an inlet of the coolant flow passage, and the second outlet 1004 is an outlet of the coolant flow passage. The second outlet 1004, the second inlet 1003 and the coolant flow passage are formed in the second heat exchange portion 1200, the first outlet 1002 and the first inlet 1001 are formed in the first heat exchange portion 1100, and the second outlet 1004 and the second inlet 1003 are located on one side of the heat management apparatus 1000 and the first outlet 1002 and the first inlet 1001 are located on another opposite side of the heat management apparatus 1000 along the stacking direction of the plates. The first inlet 1001 and the first outlet 1002 may be formed in a pipe or a block which is fixedly connected to the first plate body 1140, and the second inlet 1003 and the second outlet 1004 may be formed in a pipe or a block which is fixedly connected to the first plate body 1140. In other embodiments, the first inlet 1001 and the first outlet 1002 may be formed in the first plate body 1140, and the second inlet 1003 and the second outlet 1004 may be formed in the second plate body 1210.

Figure 7:
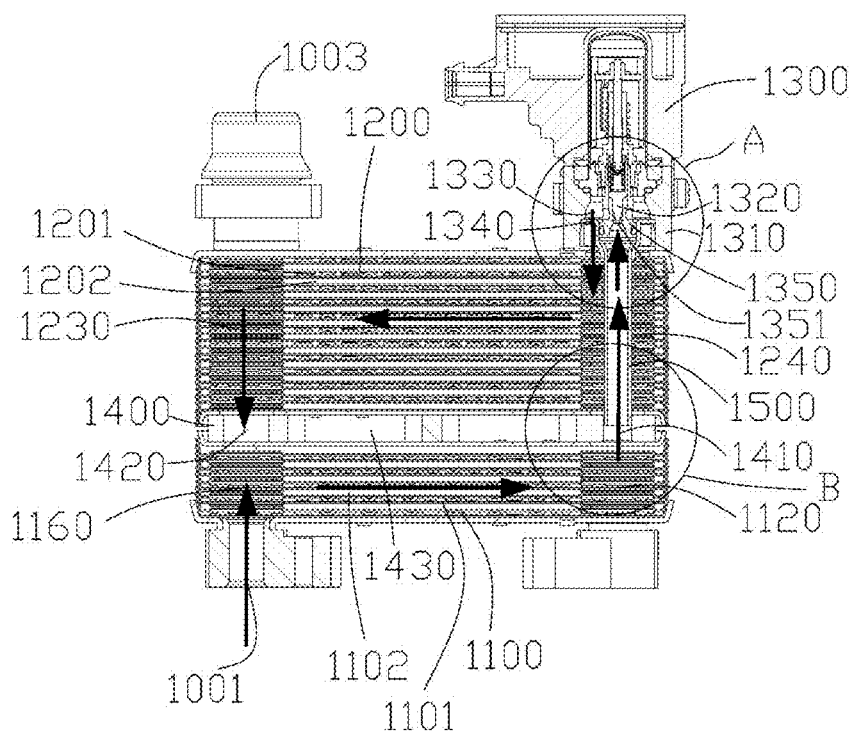
FIG. 7 is a first schematic cross-sectional view of FIG. 6 taken along line A-A.
Figure 8:
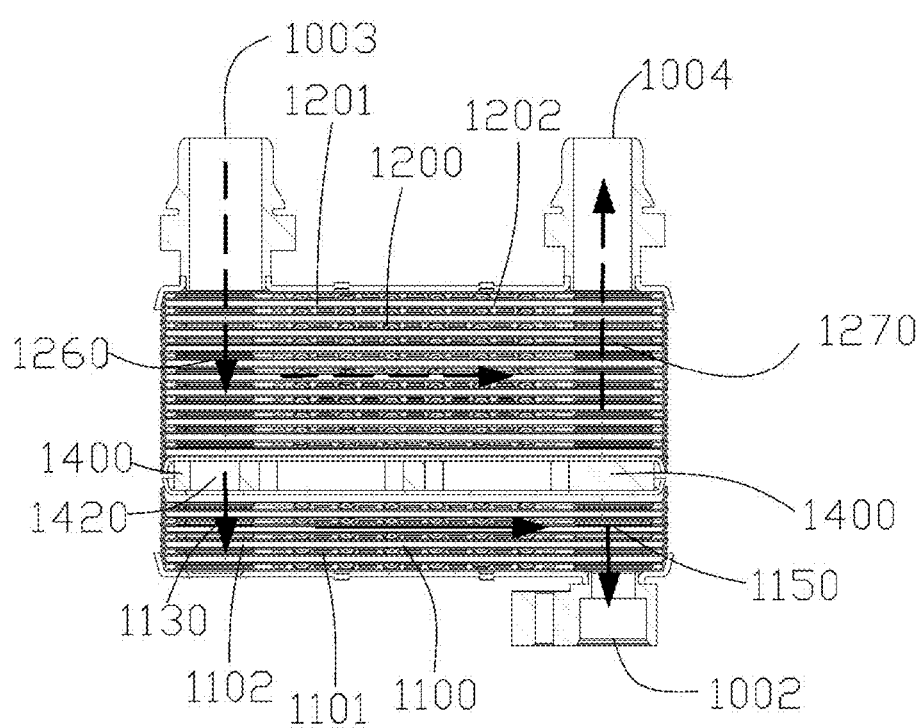
FIG. 8 is schematic cross-sectional view of FIG. 6 taken along line B-B.

Referring to FIG. 7 and FIG. 8, the refrigerant flow passage includes a first flow passage, a second flow passage and a third flow passage, the first flow passage and the second flow passage are formed in the first heat exchange portion 1100, the first inter-plate passage 1101 of the first heat exchange portion 1100 is a part of the first flow passage, and the second inter-plate passage 1102 of the first heat exchange portion 1100 is a part of the second flow passage.

The first heat exchange portion 1100 at least includes a fifth hole passage 1160, a second hole passage 1120, a third hole passage 1130 and a fourth hole passage 1150, and the above hole passages extend along the stacking direction of the plates of the first heat exchange portion 1100. The first flow passage includes the fifth hole passage 1160, the first inter-plate passage 1101 located between the plates and the second hole passage 1120, and the fifth hole passage 1160 is in communication with the second hole passage 1120 through the first inter-plate passage 1101 of the first heat exchange portion 1100. In this embodiment, the first inlet 1001 is in communication with the fifth hole passage 1160. When the heat management apparatus 1000 operates, the refrigerant flows into the fifth hole passage 1160 from the first inlet 1001, and then flows into the first inter-plate passage 1101 of the first heat exchange portion 1100, and then flows into the second hole passage 1120 after heat exchanging with the refrigerant in the second inter-plate passage 1102 of the first heat exchange portion 1100. The second hole passage 1120 has an opening on the top plate of the first heat exchange portion 1100, and the refrigerant flows out of the first heat exchange portion 1100 from the opening on the top plate of the first heat exchange portion 1100. The second flow passage includes the third hole passage 1130, the second inter-plate passage 1102 located between the plates, and the fourth hole passage 1150, and the third hole passage 1130 is in communication with the fourth hole passage 1150 through the second inter-plate passage 1102 of the first heat exchange portion 1100. The first outlet 1002 is in communication with the fourth hole passage 1150. When the heat management apparatus 1000 operates, the refrigerant in the second flow passage flows into the second inter-plate passage 1102 of the first heat exchange portion 1100 through the third hole passage 1130 and exchanges heat with the refrigerant in the first inter-plate passage 1101, and then flows into the fourth hole passage 1150. The refrigerant in the fourth hole passage 1150 flows out of the heat management apparatus 1000 through the first outlet 1002.

A first inter-plate passage 1201 of the second heat exchange portion 1200 is a part of the third flow passage, and a second inter-plate passage 1202 of the second heat exchange portion 1200 is a part of the coolant flow passage. The second heat exchange portion 1200 at least includes a first hole passage 1240, a sixth hole passage 1230, a seventh hole passage 1260 and an eighth hole passage 1270, the first hole passage 1240 and the sixth hole passage 1230 are a part of the third flow passage, and the seventh hole passage 1260 and the eighth hole passage 1270 are a part of the coolant flow passage. The third flow passage includes the first hole passage 1240, the sixth hole passage 1230 and the first inter-plate passage 1201 located in the second heat exchange portion 1200, and the first hole passage 1240 is in communication with the sixth hole passage 1230 through the first inter-plate passage 1201 of the second heat exchange portion 1200. The coolant flow passage includes the seventh hole passage 1260, the second inter-plate passage 1202 located in the second heat exchange portion 1200 and the eighth hole passage 1270, and the seventh hole passage 1260 is in communication with the eighth hole passage 1270 through the second inter-plate passage 1202 of the second heat exchange portion 1200. In this embodiment, the second inlet 1003 is in communication with the seventh hole passage 1260, and the second outlet 1004 is in communication with the eighth hole passage 1270. When the heat management apparatus 1000 operates, the coolant flows into the seventh hole passage 1260 through the second inlet 1003, and then flows into the second inter-plate passage 1202 of the second heat exchange portion 1200 and exchanges heat with the refrigerant in the third flow passage, and then flows into the eighth hole passage 1270, and finally flows out of the heat management apparatus 1000 through the second outlet 1004.

Referring to FIG. 4, FIG. 5, FIG. 7 and FIG. 8, the connecting plate body 1400 is located between the first heat exchange portion 1100 and the second heat exchange portion 1200 along the stacking direction of the plates. Specifically, the first heat exchange portion 1100 includes a first wall 1110, the second heat exchange portion 1200 includes a second wall 1220. In this embodiment, the first wall 1110 is formed on the top plate of the first heat exchange portion 1100, the second wall 1220 is formed on the bottom plate of the second heat exchange portion 1200, a lower side wall of the connecting plate body 1400 is fixed to the first wall 1110 by welding, and an upper side wall of the connecting plate body 1400 is fixed to the second wall 1220 by welding. The first wall 1110 is arranged opposite to the second wall 1220, the opposite arrangement described herein includes indirect opposite arrangement and direct opposite arrangement. The indirect opposite arrangement means that there are other objects between the first wall 1110 and the second wall 1220, such as the connecting plate body 1400. The connecting plate body 1400 may not be provided between the first wall 1110 and the second wall 1220, that is, the first wall 1110 is arranged directly opposite to the second wall 1220, and the first wall 1110 is fixed to the second wall 1220 by welding. The connecting plate 1400 further includes a first through hole 1410 and a second through hole 1420. The first through hole 1410 and the second through hole 1420 extend through the connecting plate 1400, and the first through hole 1410 and the second through hole 1420 have openings respectively on an upper wall and a lower wall of the connecting plate body 1400. The sixth hole passage 1230 is in communication with the third hole 1130 through the second through hole 1420, that is, the third flow passage is in communication with the second flow passage through the second through hole 1420. Specifically, the sixth hole passage 1230 has a second opening 1231 on the second wall, and at least part of the second opening 1231 faces the second through hole 1420 and is in communication with the second through hole 1420. The third hole passage 1130 has a first opening 1131 on the first wall, at least part of the first opening 1131 faces the second through hole 1420, and the first opening 1131 is in communication with the second opening 1231 through the second through hole 1420, so that the third hole passage 1130 is in communication with the sixth hole passage 1230 through the second through hole 1420. In this embodiment, the first opening 1131 and the second opening 1231 are staggered, and the second through hole 1420 extends narrowly and long, which is beneficial to the smooth flow of the refrigerant at the second through hole 1420. Alternatively, the first opening 1131 and the second opening 1231 can be opposite. The refrigerant in the third flow passage flows into the second flow passage of the first heat exchange portion 1100 through the second through hole 1420 after heat exchange in the second heat exchange portion 1200 with the coolant in the coolant flow passage, and then exchanges heat in the first heat exchange portion 1100 with the refrigerant in the first flow passage.

The first through hole 1410 is in communication with the second hole passage 1120. Specifically, the second hole passage 1120 forms a first communication port 1121 on the first wall 1120, and at least part of the communication port 1121 faces the first through hole 1410 and is in communication with the first through hole 1410. The first wall 1110 is sealed to a corresponding position of the connecting plate body 1400, so as to prevent the refrigerant from leaking from a connection between the first heat exchange portion 1100 and the connecting plate body 1400. The second wall 1220 is sealed to a corresponding position of the connecting plate body 1400, so as to prevent the refrigerant from leaking from a connection between the second wall 1220 and the connecting plate body 1400. In addition, in this embodiment, the connecting plate body 1400 further includes two square holes 1430. The square holes 1430 are used to reduce a weight of the connecting plate 1400 and further reduce a weight of the heat management apparatus 1000. The two square holes 1430 are larger than the first through hole 1410 and the second through hole 1420, and the square holes 1430 can reduce the heat conduction between the first heat exchange portion 1100 and the second heat exchange portion 1200. The two square holes 1430 are located near the middle of the connecting plate 1400 with a large temperature difference between the first heat exchange portion 1100 and the second heat exchange portion 1200, which is not only beneficial to reducing the heat conduction, but also beneficial to the balanced mass distribution of the heat management apparatus.

Referring to FIGS. 7 to 10, the throttle unit 1300 includes a valve core, a valve port portion 1350 and a valve seat 1370, and a valve port 1351 is formed in the valve port portion 1350. In this embodiment, the valve core is a valve needle 1320, and the valve needle 1320 can move relative to the valve port 1350 to adjust an opening of the valve port 1351. The throttle unit 1300 further includes a guide portion 1380, the guide portion 1380 is fixed to the valve seat 1370, and the guide portion 1380 can guide the valve needle 1320 and prevent the movement of the valve needle 1320 from deviating from an axial direction. The valve port portion 1350 is fixedly connected to the guide portion 1380. In this embodiment, the valve port portion 1350 is integrally arranged with the guide portion 1380, and the valve needle 1320 and the valve port 1351 are substantially coaxial. The throttle unit 1300 further includes a first valve body 1310 and a connecting portion 1340, the first valve body 1310 includes a first penetrating hole 1311, the first penetrating hole 1311 has an opening on an upper wall of the first valve body 1310, the first penetrating hole 1311 has a third opening 1312 on a bottom wall of the first valve body 1310, the bottom wall of the first valve body 1310 is relatively fixed to the second plate body 1210, such as by welding, bonding or threaded connection. The second plate body 1210 has a fourth opening 1211, the fourth opening 1211 is in communication with the first hole passage 1240, the third opening 1312 is arranged opposite to the fourth opening 1211, and the third opening 1312 is in communication with the fourth opening 1211, so that the third opening 1312 is in communication with the first hole passage 1240. The valve seat 1370 protrudes into a chamber formed by the first penetrating hole 1311 and is fixed to a wall of the first penetrating hole 1311. The valve seat 1370 is fixed to the wall of the first penetrating hole 1311 by threaded connection, insertion or welding. Compared with the bottom wall of the first valve body 1310, the valve seat 1370 is relatively closer to the upper wall of the first valve body. At least part of the connecting portion 1340 protrudes into the chamber formed by the first penetrating hole 1311 and is fixed to the wall of the first penetrating hole 1311. In this embodiment, the first penetrating hole 1311 is formed with a step surface, and the connecting portion 1340 is fixed to the step surface. Compared with the upper wall of the first valve body, the connecting portion 1340 is relatively closer to the lower wall of the first valve body. A space between the valve seat 1370 and the connecting portion 1340 forms a valve chamber 1330 along an extending direction of the first penetrating hole 1311, and the valve port 1351 is in communication with the valve chamber 1330 when the valve port 1351 is opened by the valve needle 1320.

Figure 9:
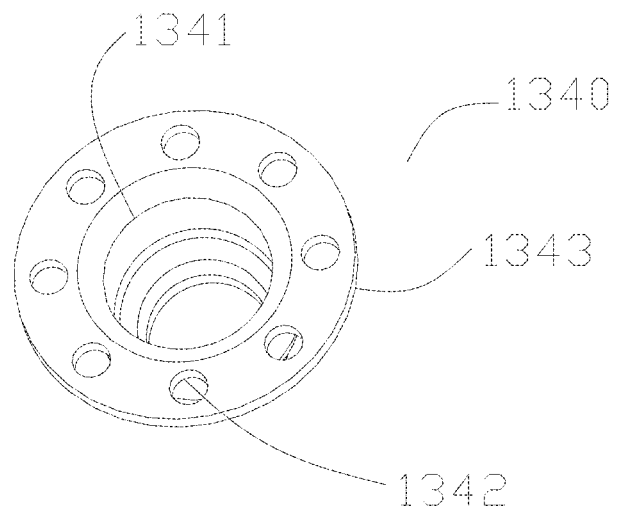
FIG. 9 is a schematic perspective view of a connecting portion.
Figure 10:
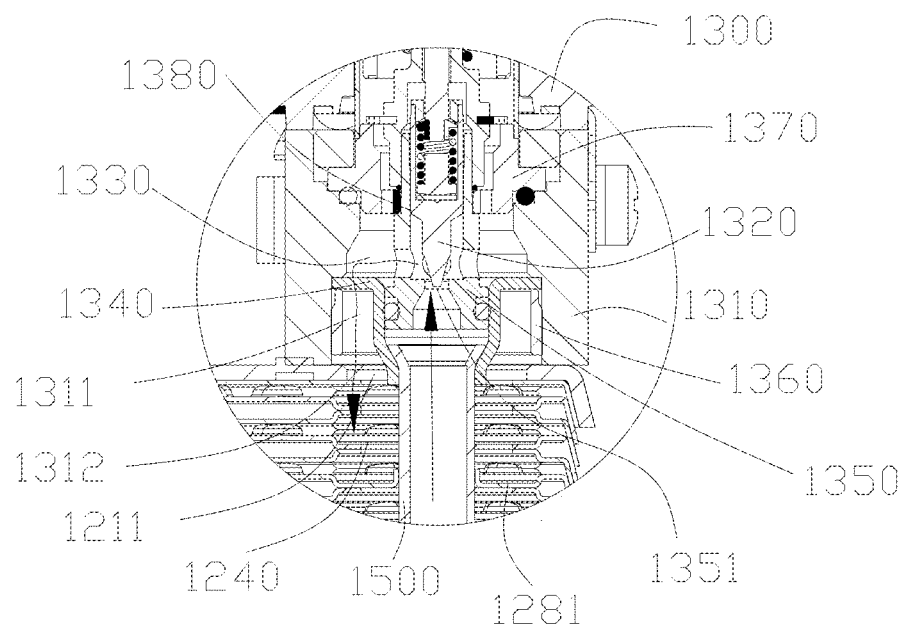
FIG. 10 is a schematic enlarged view of portion A in FIG. 7.

Referring to FIG. 9 and FIG. 10, the connecting portion 1340 further includes a communication portion 1342, a fixing portion 1343 and an accommodating portion 1341. The fixing portion 1343 is fixed to the wall of the first penetrating hole 1311. In this embodiment, the throttle unit 1300 further includes a support ring 1360, the support ring 1360 is located in the first penetrating hole 1311, and the support ring 1360 is threadedly fixed to the first valve body 1310, which further limits the fixing portion 1343 relative to the step surface of the first valve body 1310. In other embodiments, one end of the support ring 1360 abuts against the second plate body 1210, and another end of the support ring 1360 abuts against the fixing portion 1343. During welding, the connecting portion 1340 is fixed to the step surface of the first valve body 1310 by the support ring 1360, so as to prevent the connecting portion 1340 from shaking. An accommodating chamber is formed in the accommodating portion 1341, at least part of the valve port portion 1350 is located in the accommodating chamber of the accommodating portion 1341, an outer wall of the valve port portion 1350 is sealed to an inner wall of the accommodating portion 1341, for example, a sealing ring is provided between the outer wall of the valve port portion 1350 and the inner wall of the accommodating portion 1341.

The refrigerant flow passage further includes a fourth flow passage. In this embodiment, the fourth flow passage is located in the heat exchange core body 1600, and the fourth flow passage is configured to communicate the first flow passage with the third flow passage. Specifically, the third flow passage includes the first hole passage 1240, the first flow passage includes the second hole passage 1120, at least part of the fourth flow passage is located in the first hole passage 1240, one end of the fourth flow passage is in communication with the second hole passage 1120, and another end of the fourth flow passage is in communication with the valve port 1351, so that the refrigerant in the first heat exchange portion 1100 can flow into the valve port 1351 through the fourth flow passage.

The heat management apparatus 1000 includes a pipe body 1500 which is hollow, two ends of the pipe body 1500 are open, at least part of the fourth flow passage is located in the pipe body 1500, most of the pipe body 1500 is located in the first hole passage 1240, or in other words, the pipe body 1500 is accommodated in the first hole passage 1240. Specifically, each first plate of the second heat exchange portion 1200 includes a first orifice 1204, and multiple orifices are stacked to form the first hole passage 1240. The first hole passage 1240 is located on a circumferential side of the pipe body 1500 along a radial direction of the first hole passage 1240, or in other words, at least part of the fourth flow passage is accommodated in the first orifice 1204. Along an axial direction of the first hole passage 1240, at least part of the pipe body 1500 is located between the valve port 1351 and the second wall 1220, a second end portion of the pipe body 1500 is located in the first through hole 1410, and an outer wall of the second end portion of the pipe body 1500 is sealedly fixed to an inner wall of the first through hole 1410, so that a chamber of the first through hole 1410 is in communication with a chamber of the pipe body 1500, and thus the first flow passage is in communication with the chamber of the pipe body 1500. It can be known that the second wall 1220 has an opening for accommodating the pipe body 1500. In this embodiment, the fourth flow passage includes the chamber of the pipe body 1500, and the first flow passage can be in communication with the valve port 1351 through the fourth flow passage. A first end portion of the pipe body 1500 is located in the accommodating chamber of the accommodating portion 1341, and an outer wall of the first end portion of the pipe body 1500 is sealedly fixed to an inner wall of the accommodating portion 1341, and the sealing may be realized by welding.

Along the extending direction of the first penetrating hole 1311, the first end portion of the pipe body 1500 is closer to the second heat exchange portion 1200 than the valve port portion 1350, the valve port portion 1350 is relatively close to the valve seat 1370, and the opening of the pipe body 1500 faces the valve port 1351, so that the chamber of the pipe body 1500 is in communication with the valve port 1351. Along a radial direction of the first penetrating hole 1311, the communication portion 1342 is located between the fixing portion 1343 and the accommodating portion 1341, and the valve chamber 1330 is in communication with the first hole passage 1240 through the communication portion 1342. In this embodiment, the communication portion 1342 is a hole which extends through the connecting portion 1340. When the heat management apparatus 1000 operates, the refrigerant flowing through the pipe body 1500 is throttled at the valve port 1351, flows into the valve chamber 1330, and then flows into the first hole passage 1240 through the communication portion 1343, that is, flows into the third flow passage. In this embodiment, the connecting portion 1340 is integrally formed by stamping plates, which substantially has a horn shape. In other embodiments, the fixing portion 1343 may be fixed between the second plate body 1210 and the first valve body 1310, or the fixing portion 1343 is accommodated in the fourth opening 1211, and is fixed to an inner wall of the fourth opening 1211, so that there is no need to provide the support ring 1360, which can relatively reduce the component and the assembly process. In addition, the connecting portion 1340 may only include the accommodating portion 1341, at least part of the valve port portion 1350 is located in the chamber formed by the accommodating portion, a side wall of the valve port portion 1350 is sealedly fixed to the inner wall of the accommodating portion 1341, the first end portion of the pipe body 1500 is located in the chamber formed by the accommodating portion 1341 or the accommodating portion 1341 is located in the first end portion, and a wall of the first end portion is sealedly fixed to a wall of the accommodating portion 1341, and the sealing is generally realized by welding.

Figure 11:
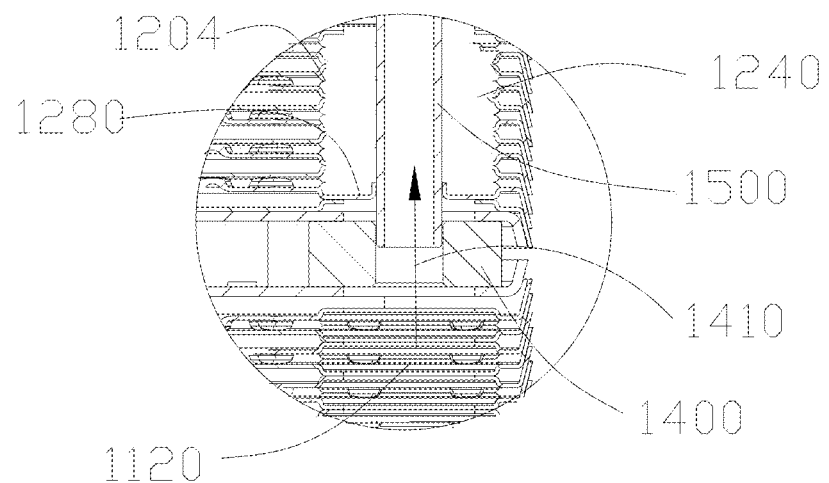
FIG. 11 is a schematic enlarged view of portion B in FIG. 7.

Referring to FIG. 10 and FIG. 11, the second heat exchange portion 1200 includes a first separation plate 1280, the first separation plate 1280 and one plate of the second heat exchange portion 1200 have an integral structure, the first separation plate 1280 forms a bottom wall of the first hole passage 1240 along the axial direction of the first hole passage 1240, the first separation plate 1280 includes a through hole for accommodating the pipe body 1500, and a wall of the first separation plate 1280 is fixed to and sealed to a wall of the pipe body 1500. In addition, the second heat exchange portion 1200 further includes a second separation plate 1281, the second separation plate 1281 is closer to the throttle unit 1300 than the first separation plate 1280, the second separation plate 1281 is located in the first hole passage 1240, the second separation plate 1281 and one plate of the second heat exchange portion 1200 have an integral structure, the second separation plate 1281 also includes a through hole for accommodating the pipe body, and a wall of the second separation plate 1281 is sealed to an outer wall of the pipe body 1500, so that the second separation plate 1281 can change a flow direction of the refrigerant, and the second heat exchange portion 1200 has multiple flow routes.

Referring to FIG. 7 and FIG. 8, an operation mode of the heat management apparatus 1000 is described with reference to the heat management system shown in FIG. 1. The heat management system includes a compressor 100, a condenser 200 and a heat management apparatus 1000, an outlet of the compressor 100 is in communication with a first inlet 1001 of the heat management apparatus 1000 through the condenser 200, and a first outlet 1002 of the heat management apparatus 1000 is in communication with an inlet of the compressor 100. The heat management system further includes a first heat exchanger 400 and a pump 300, a second inlet 1003 of the heat management apparatus 1000 is in communication with a second outlet 1004 of the heat management apparatus 1000 through the first heat exchanger 400 and the pump 300, or further, the coolant flow passage of the heat management apparatus 1000, the first heat exchanger 400 and the pump 300 form a coolant system or a part of the coolant system, and the coolant flows in the coolant system driven by the pump 300. When the heat management apparatus operates The high-temperature and high-pressure refrigerant releases heat in the condenser 200; the relatively low-temperature and high-pressure refrigerant flows into the refrigerant flow passage of the heat management apparatus 1000 through the first inlet 1001, that is, the first flow passage of the first heat exchange portion 1100, and then flows into the chamber of the pipe body 1500; the refrigerant flows into the valve chamber 1330 after being throttled and depressurized by the valve port 1351, and then flows into the first hole passage 1240, that is, the third flow passage; the refrigerant absorbs heat of the coolant in the third flow passage to lower the temperature of the coolant, and then flows into the sixth flow passage 1230; the refrigerant in the third flow passage flows into the second flow passage through the second through hole 1420 of the connecting pipe body 1400, and then is discharged out of the heat management apparatus 1000 through the first outlet 1002. The refrigerant in the second flow passage can exchange heat in the first heat exchange portion 1100 with the refrigerant in the first flow passage, which further lowers the temperature of the refrigerant in the first flow passage, and increases the temperature of the refrigerant in the second flow passage, and is beneficial to reducing the liquid hammer of the compressor. The coolant in the coolant flow passage flows into the first heat exchanger 400 to lower the temperature of the battery or other devices. The heat management apparatus 1000 includes the first heat exchange portion 1100 and the second heat exchange portion 1200, the first heat exchange portion 1100 and the second heat exchange portion 1200 are fixed by the connecting plate body 1400, the first heat exchange portion 1100 exchanges heat by refrigerant-refrigerant, the second heat exchange portion 1200 exchanges heat by refrigerant-coolant, the refrigerant of the first heat exchange portion 1100 is in communication with the throttle unit 1300 through the pipe body 1500, the pipe body 1500 is arranged inside the heat management apparatus 1000, the throttle unit 1300 is fixed to the second plate body of the second heat exchange portion 1200, the throttled refrigerant exchanges heat in the second heat exchange portion 1200 with the coolant to lower the temperature of the coolant, and the pipe body 1500 is arranged inside the heat management apparatus 1000, which relatively reduces a length of the heat management apparatus along the stacking direction of the plates, or in other words, reduces a volume of the heat management apparatus, and can effectively reduce the external damage to the pipe body, so as to improve the service life of the heat management apparatus.

Figure 2:
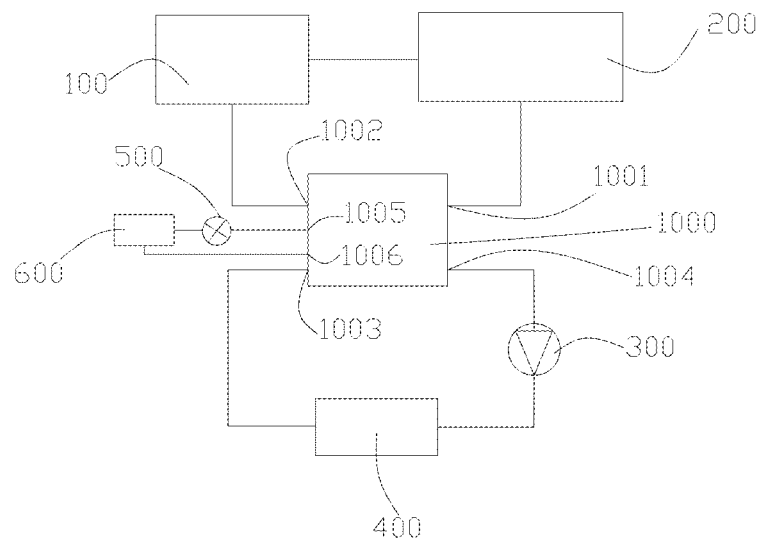
FIG. 2 is a schematic block diagram showing another connection of the heat management system.
Figure 3:
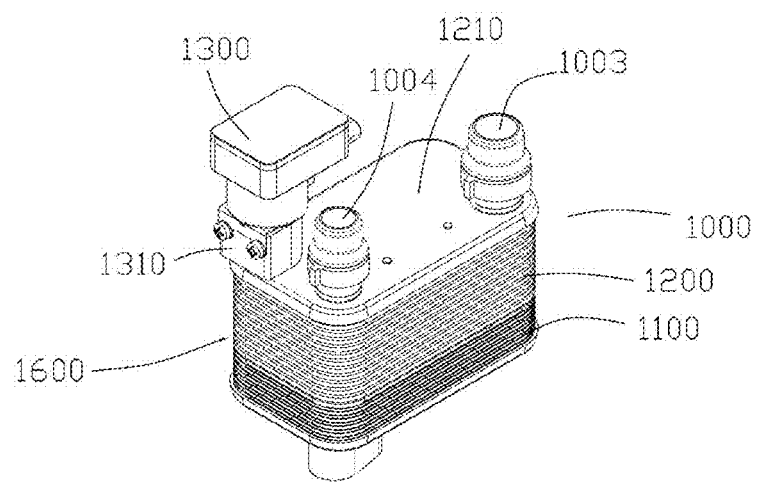
FIG. 3 is a schematic perspective view of a first embodiment of a heat management apparatus.
Figure 4:
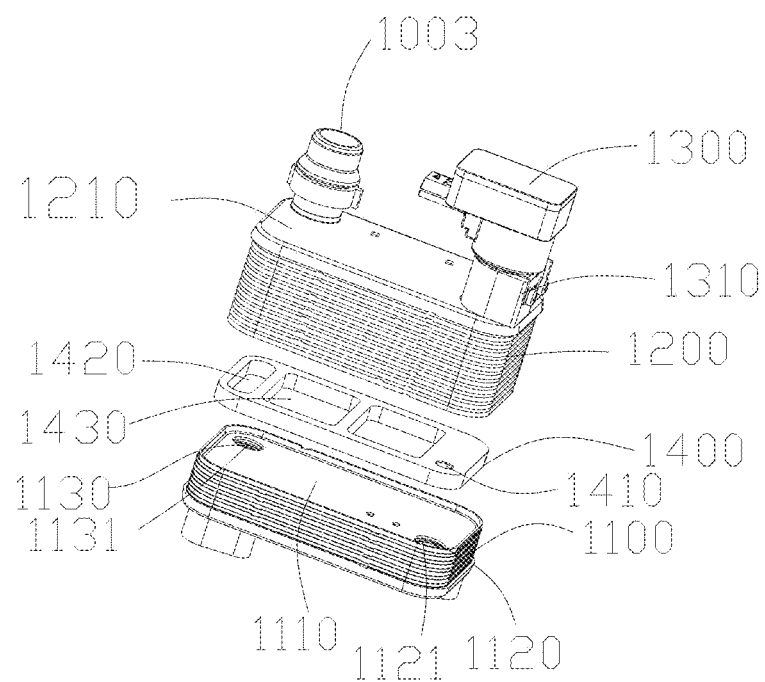
FIG. 4 is a schematic partial exploded view of the heat management apparatus of FIG. 3 viewed from a first perspective.
Figure 5:
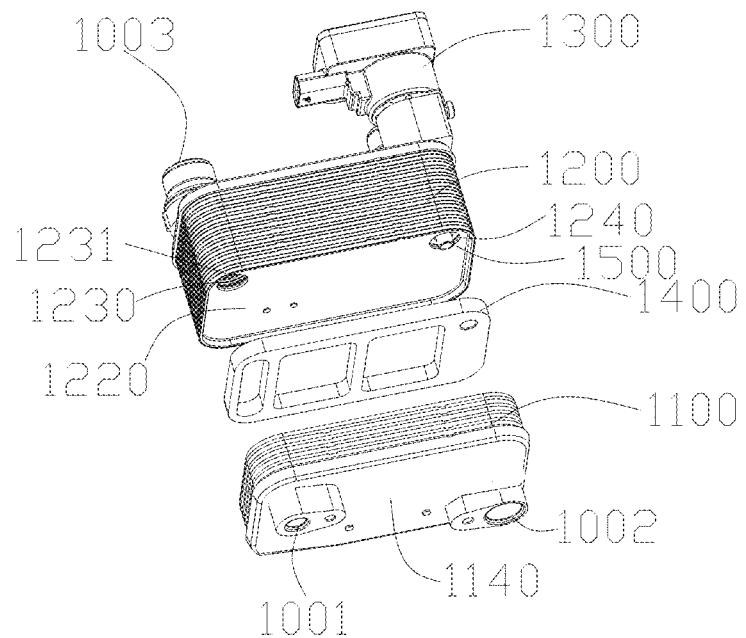
FIG. 5 is a schematic partial exploded view of the heat management apparatus of FIG. 3 viewed from a second perspective.
Figure 6:
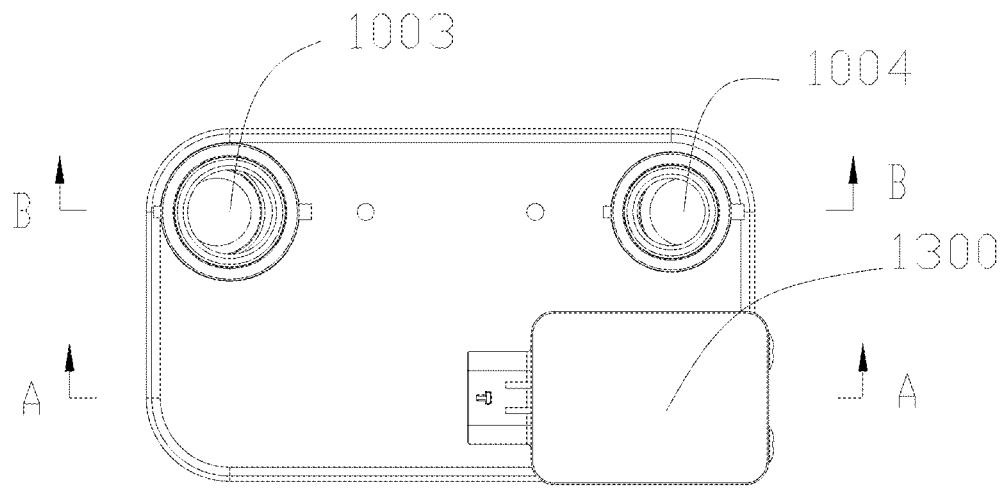
FIG. 6 is a schematic top view of the heat management apparatus of FIG. 3.
Figure 12:
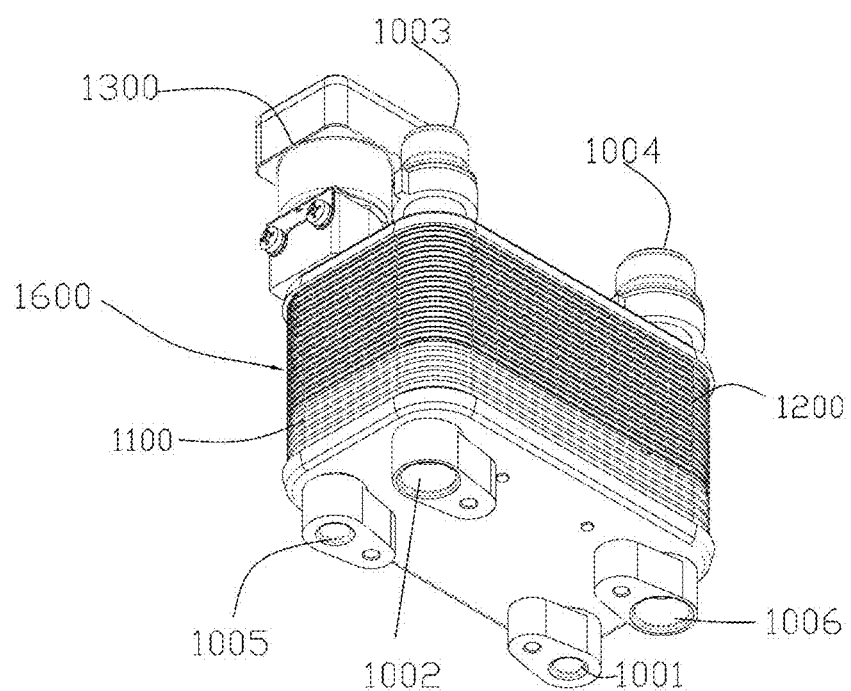
FIG. 12 is a schematic perspective view of a second embodiment of the heat management apparatus.

Referring to FIG. 2 and FIG. 12, FIG. 2 is another embodiment of the heat management system. In this embodiment, compared with the embodiment shown in FIG. 1, the heat management apparatus 1000 further includes a third outlet 1005 and a third inlet 1006. The third outlet 1005 is in communication with the second hole passage 1120, so that the refrigerant in the second hole passage 1120 can flow into the throttle unit 1300 through the pipe body 1500 and can be discharged from the third outlet 1005. The third inlet 1006 is in communication with the third hole passage 1130, that is, the refrigerant flowing into the third hole passage 1130 includes not only the refrigerant flowing from the second heat exchange portion 1200, but also the refrigerant flowing from the third inlet 1006. In this embodiment, the refrigerant in the first flow passage of the heat management apparatus 1000 flows into the throttle unit 1300 through the pipe body 1500 or flows into the throttle unit 1300 through the third outlet 1005, and then flows into the second heat exchange portion 600 to absorb the external heat after being throttled by the throttle unit 500; and then the refrigerant flows into the first heat exchange portion 1100 of the heat management apparatus through the third inlet 1006, and finally flows into the compressor 100 after being discharged from the first outlet 1002. The heat management apparatus 1000 is added with the third outlet 1005 and the third inlet 1006 in the first heat exchange portion 1100, so that the second heat exchange portion 600 can be connected to the heat management system as a new evaporator, and the heat management apparatus 1000 has a higher integration.

Figure 13:
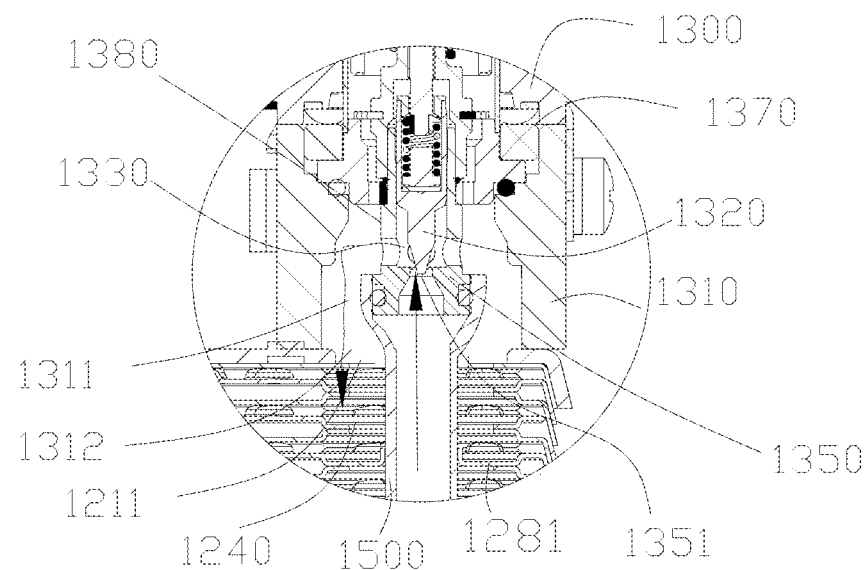
FIG. 13 is a second schematic enlarged view of portion A.

Referring to FIG. 13, the solution shown in FIG. 13 is that the heat management apparatus does not include the connecting portion 1340. At least part of the valve port portion 1350 is accommodated in a chamber formed by the first end portion of the pipe body 1500, and a side wall of the valve port portion 1350 is sealed to a wall of the first end portion. Alternatively, in other embodiments, the valve port portion 1350 includes a communication chamber, the valve port 1351 is located above the communication chamber, the valve port 1351 is in communication with the communication chamber, the first end portion of the pipe body 1500 is located in the communication chamber, and an outer wall of the first end portion of the pipe body 1500 is fixedly connected to and is sealed to a wall forming the communication chamber. In this way, the valve port 1351 is in communication with the chamber of the pipe body 1500. Since there is no connecting portion 1340, the throttled refrigerant directly flows into the first hole passage 1240 after flowing into the valve chamber 1330, which not only reduces the components, but also reduces the mounting steps. The valve port portion 1350 shown in FIG. 13 and the first end portion of the pipe body 1500 are located in the first penetrating hole 1311 of the first valve body, and the valve port portion 1350 and the first end portion of the pipe body 1500 can be located in the first hole passage 1240 after being fixed, so that a length of the first valve body along the radial direction of the first hole passage 1240 can be reduced, and the heat management apparatus has a compact volume.

Figure 20:
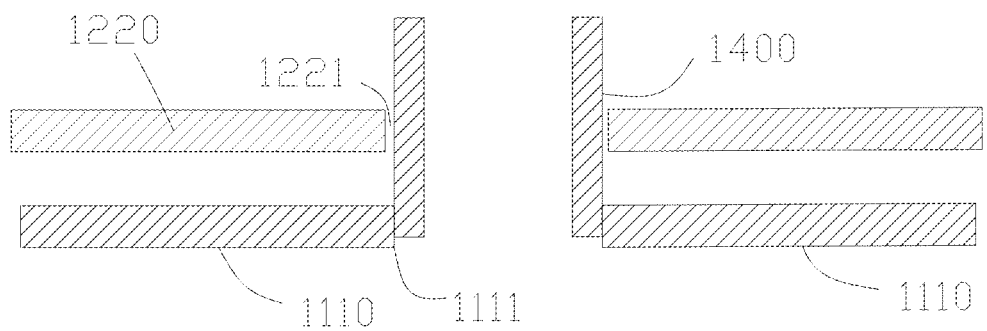
FIG. 20 is a schematic view showing a connection of a pipe body with a first wall and a second wall.

Referring to FIG. 20, the heat management apparatus may not include the connecting plate body 1400, and the same part can make reference to FIG. 7. The second end portion of the pipe body 1500 is located in a first communication port 1111, and an outer wall of the second end portion of the pipe body 1500 is sealed to a wall forming the first communication port 1111, so that the refrigerant in the second hole passage 1120 can flow into the chamber of the pipe body 1500. The second wall 1220 includes a second communication port 1221, the pipe body 1500 is accommodated in the second communication port 1221, and the first separation plate 1280 can be a part of the second wall 1220 or a part of a plate adjacent to the second wall 1220, so that the refrigerant in the first hole passage 1240 may not leak between the first heat exchange portion 1100 and the second heat exchange portion 1200. Alternatively, in order to increase a sealing surface between the pipe body 1500 and the wall of the first communication port 1111, the wall of the communication port 1111 may be a protrusion relative to a main body of the first wall 1110. Compared with the heat management apparatus 1000 with the connecting plate body 1400, the weight in this embodiment is light and the volume is small.

Figure 14:
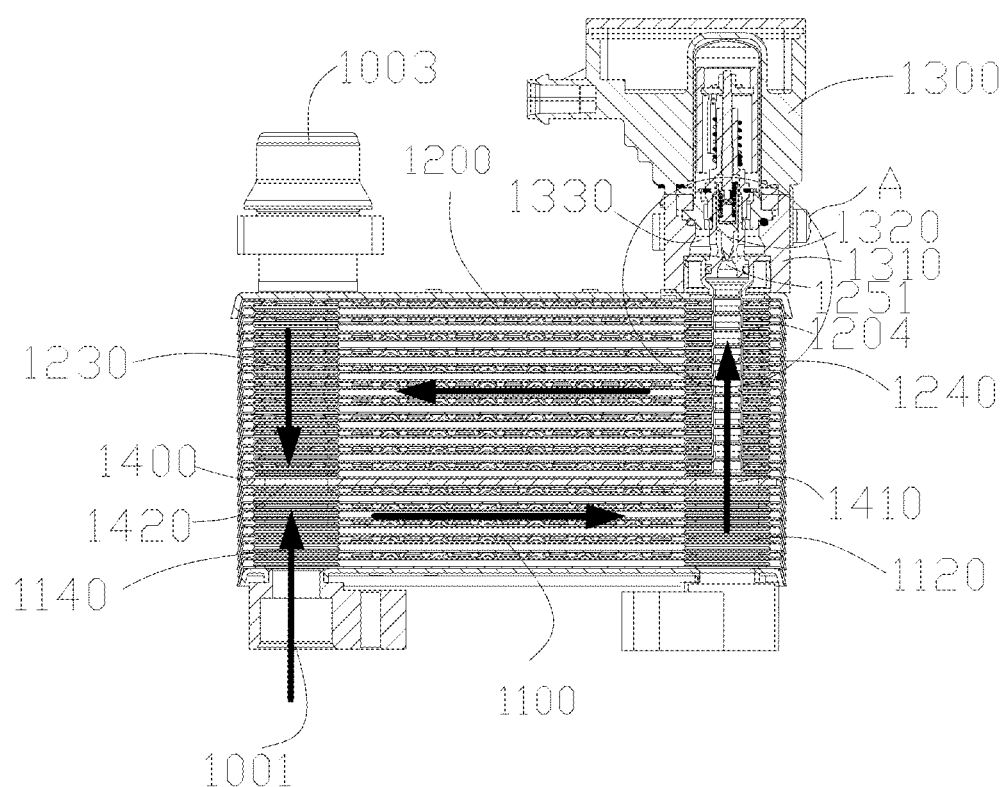
FIG. 14 is another schematic cross-sectional view of FIG. 6 taken along line A-A.
Figure 15:
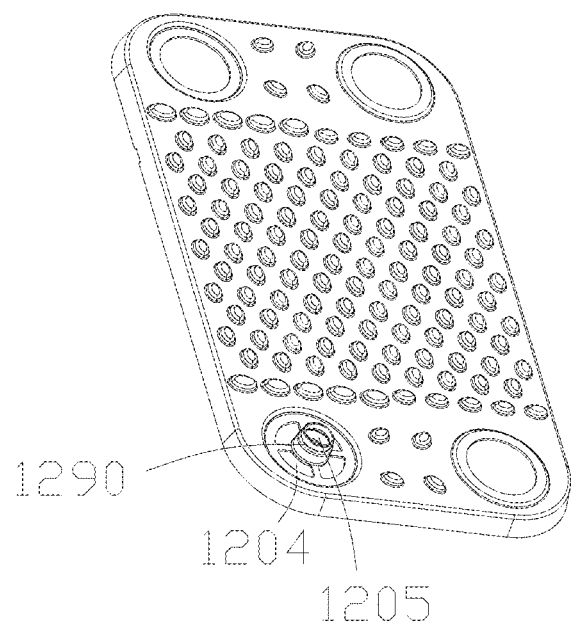
FIG. 15 is a schematic structural view of a plate of a second heat exchange portion in FIG. 14.
Figure 16:
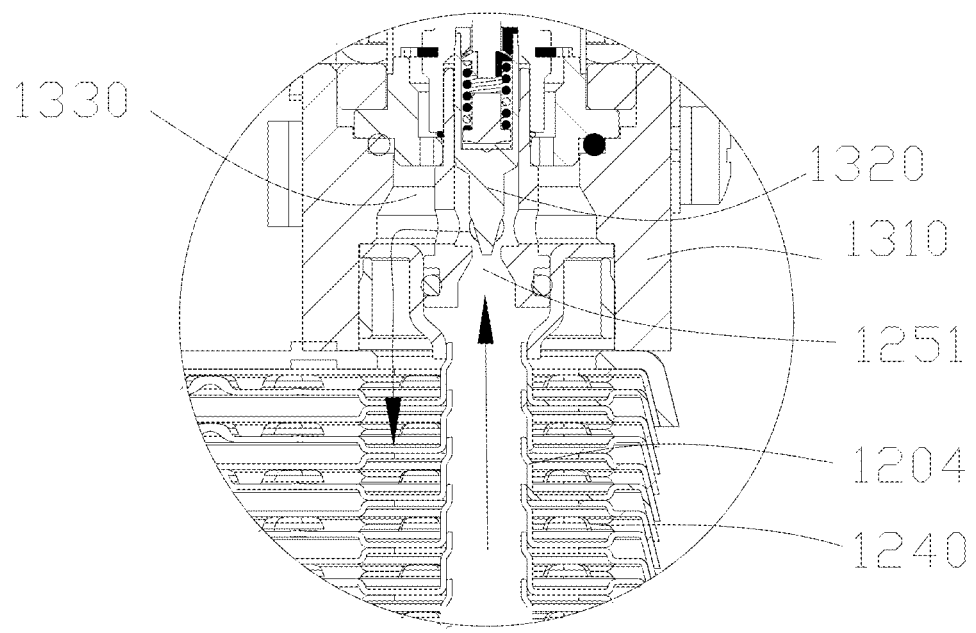
FIG. 16 is a schematic enlarged view of portion A in FIG. 14.

Referring to FIGS. 14 to 16, compared with the embodiment shown in FIG. 7, the heat management apparatus 1000 is not separately provided with the pipe body 1500, each first plate of the second heat exchange portion 1200 includes at least one first orifice 1204 and a second orifice 1205, a wall forming the second orifice 1205 includes a first flange 1290, the first flange 1290 is folded from a main body of the first plate of the second heat exchange portion 1200 toward the throttle unit 1300, the first flange 1290 is inserted into an upper first flange adjacent to the first flange 1290, and the adjacent two flanges 1290 are sealed, inner walls of the first flanges 1290 of the multiple plates form a wall of the fourth flow passage, and part of the first flange 1290 adjacent to the valve port portion 1350 is located in the accommodating portion 1341, so that the fourth flow passage is in communication with the valve port 1351, and the first flange 1290 adjacent to the valve port portion 1350 is sealed to the wall of the accommodating portion 1341. Four first orifices 1204 are defined on an outer side of the second orifice 1205 along the radial direction of the first hole passage, and the first orifices 1204 form the first hole passage 1240. In other embodiments, each plate includes at least one first orifice 1204. The third opening 1312 faces the first hole passage 1240, which realizes the communication between the valve chamber 1330 and the first hole passage 1240. In other embodiments, the connecting portion 1340 may be inserted into and be sealedly fixed to an inner wall of the first flange 1290. The valve port portion 1350 can be directly and sealedly fixed to the inner wall or an outer wall of the first flange 1290 in a case that the throttle unit 1300 does not include the connecting portion 1340, so as to realize the communication between the valve port 1351 and the fourth flow passage. It can be known that in the plates of the second heat exchange portion 1200, the plate closest to the first heat exchange portion 1100 includes the second orifice 1205 and the first separation plate 1280 and does not include the first orifice 1204, and the first separation plate 1280 is the bottom wall of the first hole passage 1240.

Figure 17:
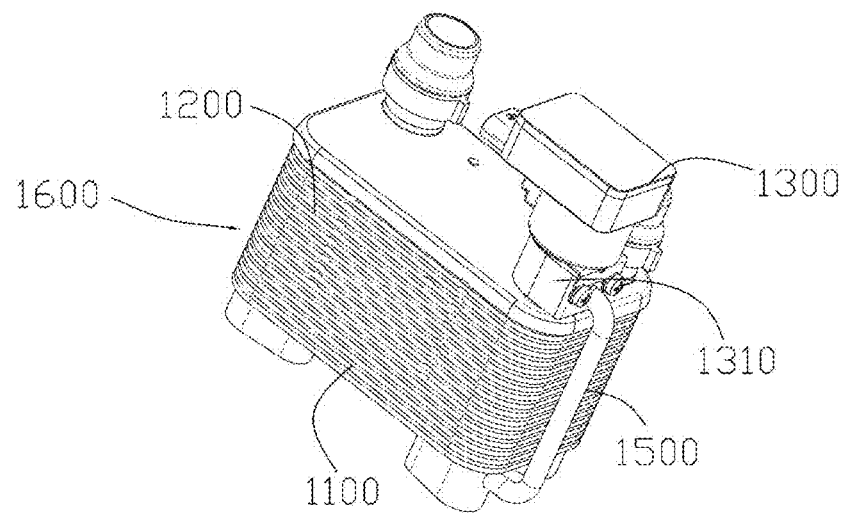
FIG. 17 is a schematic perspective view of a fourth embodiment of the heat management apparatus.
Figure 18:
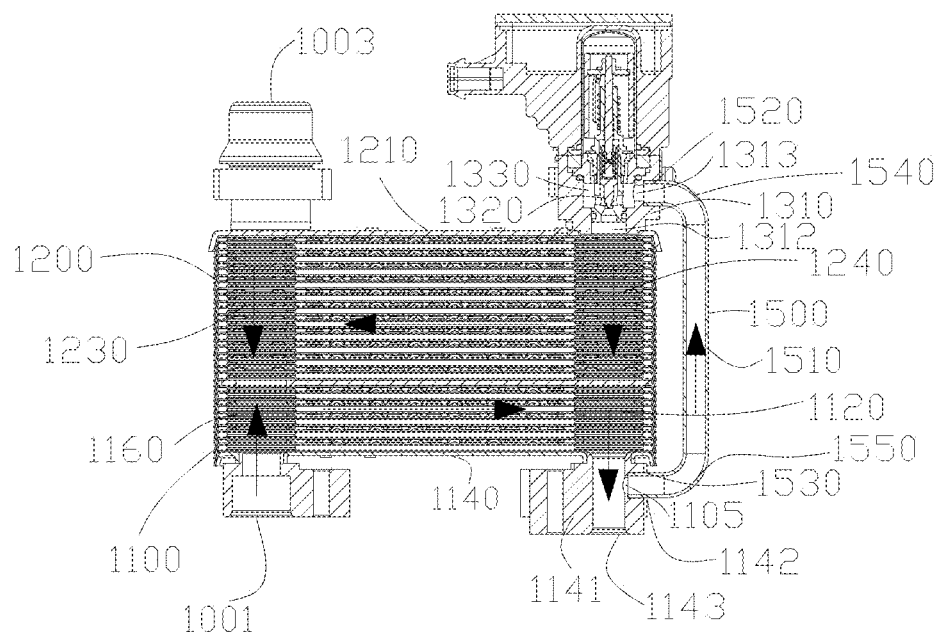
FIG. 18 is a schematic cross-sectional view of FIG. 17.
Figure 19:
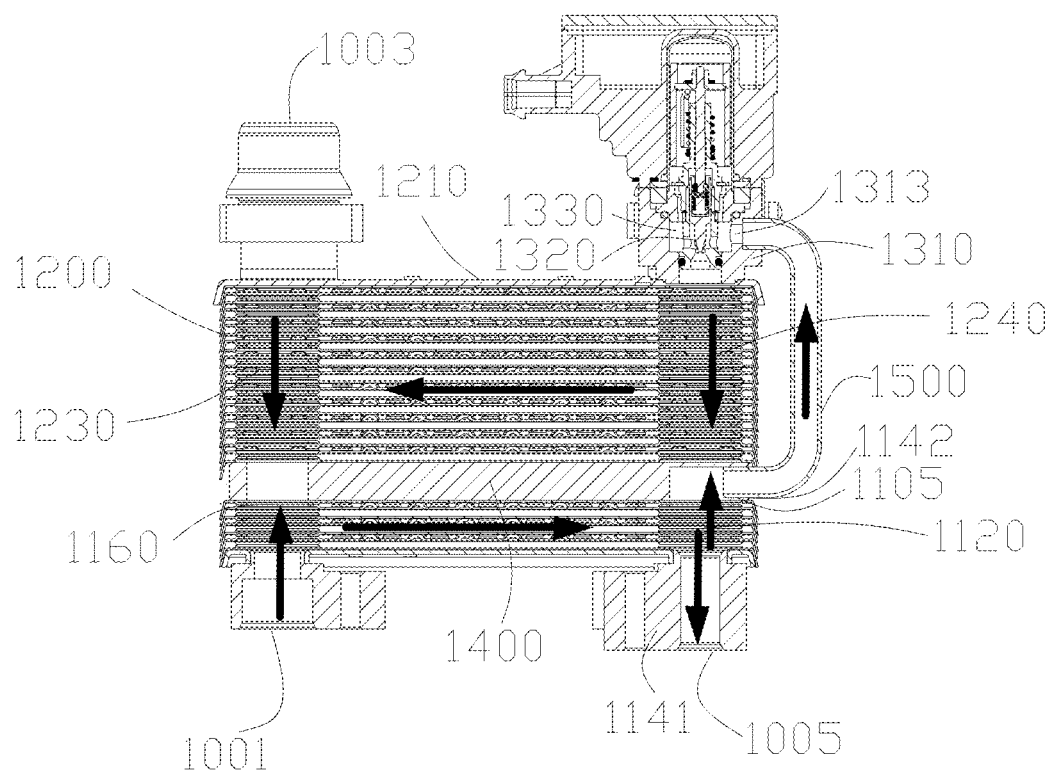
FIG. 19 is a schematic cross-sectional view of the thermal management apparatus.

Referring to FIGS. 17 to 19, in this embodiment, the first valve body 1310 is fixedly connected to the second plate body 1210, the second plate body 1210 has an opening for accommodating part of the first valve body 1310, the first penetrating hole 1311 has a third opening 1312 on the bottom wall of the first valve body 1310, and the third opening 1312 faces the first hole passage 1240, the first penetrating hole 1311 includes a chamber for accommodating the valve port portion 1350, the side wall of the valve port portion 1350 is sealed to an inner wall of the first penetrating hole 1311, and the fourth flow passage is located outside the heat exchange core body 1600.

The heat management apparatus 1000 includes a connecting body, the connecting body includes the fourth flow passage, the connecting body includes the first end portion 1520 and the second end portion 1530. Along the axial direction of the first hole passage 1240, the first end portion 1520 is located on one side of the heat exchange core body 1600 and is relatively close to the second plate body 1210, and the second end portion 1530 is located on another opposite side of the heat exchange core body 1600 and is relatively close to the first plate body 1140, and the first end portion 1520 and the second end portion 1530 both include an opening which is in communication with the fourth flow passage. In this embodiment, the connecting body is the pipe body 1500, the fourth flow passage includes the chamber of the pipe body 1500, the pipe body 1500 is one form of the connecting body, and a plate body or a block body may be feasible forms of the connecting body. The heat management apparatus 1000 includes a first transition passage 1313 and a second transition passage 1105, the first transition passage 1313 is formed in the first valve body 1310, the first transition passage 1313 is located on an upper side of the second plate body 1210, the first transition passage 1313 has an opening on a wall of the first valve body 1310, the first end portion 1520 is located in the first transition passage 1313 and is sealedly fixed to an inner wall of the first transition passage 1313, so that the fourth flow passage is in communication with the valve chamber 1330. The second transition passage 1105 is located at one end of the second hole passage 1120 and is in communication with the second hole passage 1120. In this embodiment, the second transition passage 1105 is located in the first plate body 1140 or is fixedly connected to the first plate body 1140, the second end portion 1530 is located in the second transition passage 1105, and a wall of the second end portion 1530 is sealedly fixed to a wall of the second transition passage 1105, so that the fourth flow passage is in communication with the second hole passage 1120. The pipe body 1500 is arranged outside the heat exchange core body 1600, and has a gap with a side wall of the heat exchange core body 1600, which is beneficial to reducing the heat exchange between the refrigerant in the pipe body 1500 and the refrigerant in the heat exchange core body 1600. Alternatively, the pipe body 1500 may be fixed to an outer wall of the heat exchange core body 1600, so as to enhance the overall mechanical performance of the heat management apparatus. The wall of the first end portion 1520 and the wall of the first transition passage 1313 can be sealed by a sealing ring, the wall of the second end portion 1530 and the second transition passage 1105 can be sealed by a sealing ring, and the pipe body 1500 can be mounted by insertion, which has a simple mounting method. Alternatively, the pipe body 1500 can be mounted and sealed by welding.

In a specific embodiment, referring to FIG. 18, the first plate body 1140 includes a plate body portion 1144 and a protrusion portion 1141, the plate body portion 1144 is substantially parallel to the plates, the second transition passage 1105 has an opening, facing the second hole passage 1120, on an upper wall of the plate body portion, the protrusion portion 1141 protrudes from the heat exchange core body 1600 relative to the plate body portion 1144, and the protrusion portion 1141 and the plate body portion 1144 can have an integral structure or be integrated by welding. The second transition passage 1105 has a first connecting port 1142 and a second connecting port 1143 on the protrusion portion 1141, the first connecting port 1142 is located on a side wall of the protrusion portion 1141, the second connecting port 1143 faces the second hole passage 1120, and the second end portion 1530 is fixed to a wall of the first connecting port 1142 by welding. The second hole passage 1120 is in communication with the chamber of the pipe body 1500 through the second transition passage 1105, so as to be in communication with the valve chamber 1330 of the throttle unit 1300. The second connecting port 1143 may be connected to other external device, in this case the second connecting port 1143 is the third outlet 1005, so that the second hole passage 1120 can be in communication with other component. The second transition passage 1105 can only include the first connecting port 1142 on the protrusion portion 1141, the first connecting port 1142 can face the second hole passage 1120, and the first connecting port 1142 is located on the side wall of the protrusion portion 1141. In addition, the first plate body 1140 does not include the protrusion portion, which is not described in detail.

With reference to FIG. 19, the heat management apparatus 1000 includes the connecting plate body 1400, and the connecting plate body 1400 is located between the first heat exchange portion 1100 and the second heat exchange portion 1200 along the axial direction of the first hole passage 1240. The connecting plate body 1400 includes a first through hole 1410, the chamber of the first through hole 1410 includes the second transition passage 1105, the connecting plate body 1400 includes a first connecting wall, the first connecting wall is in contact with the first wall 1110 and is fixed to the first wall 1110, the second transition passage 1105 has an opening, in communication with the second hole passage 1120, on the first connecting wall of the connecting plate body 1400, the second transition passage 1105 has a first connecting port 1142 on a second connecting wall of the connecting plate body 1400, the first connecting wall is intersected with the second connecting wall, and the second connecting wall is substantially perpendicular to the plates of the heat exchange core body 1600. The third outlet 1005 of the heat management apparatus 1000 is formed in the first plate body 1140 or the protrusion portion 1141 which is fixedly connected to the first plate body, and the third outlet 1005 is in communication with the second hole passage 1120. The connecting body further includes a main body portion 1510, the main body portion 1510 is substantially parallel to the side wall of the heat exchange core body 1600, the main body portion 1510 is located between the first end portion 1520 and the second end portion 1530, the connecting body further includes at least one first bending portion 1540 between the first end portion 1520 and the second end portion 1530, and the connecting body further includes at least one second bending portion 1550 between the main body portion 1510 and the second end portion 1530, so that the working medium flows more smoothly.

It should be noted that, the above embodiments are only intended to illustrate the present application and not to limit the technical solutions described in the present application. Although the present specification has been described in detail with reference to the embodiments described above, it should be understood by those skilled in the art that, various modifications and equivalents can be made to the technical solutions of the present application without departing from the spirit and scope of the present application, all of which should be contained within the scope of the claims of the present application.

What is claimed is:

1. A heat management apparatus, comprising a throttle unit and a heat exchange core body, wherein the throttle unit is fixedly connected with the heat exchange core body or connected with the heat exchange core body in a limited manner, and the heat exchange core body comprises a plurality of plates which is stacked; the heat exchange core body comprises a first heat exchange portion and a second heat exchange portion located above the first heat exchange portion, the heat management apparatus comprises a refrigerant flow passage and a coolant flow passage, the coolant flow passage is located in the second heat exchange portion, the refrigerant flow passage comprises a first flow passage, a second flow passage and a third flow passage, the first flow passage and the second flow passage are located in the first heat exchange portion, the third flow passage is located in the second heat exchange portion, a refrigerant in the first flow passage is configured to exchange heat with a refrigerant in the second flow passage in the first heat exchange portion, a refrigerant in the third flow passage is configured to exchange heat with a coolant in the coolant flow passage in the second heat exchange portion; the first heat exchange portion comprises a first wall, the second heat exchange portion comprises a second wall, and the first wall is arranged opposite to the second wall; and the throttle unit comprises a valve port portion, the valve port portion comprises a valve port, the first flow passage is in communication with the third flow passage through the valve port, and the third flow passage is in communication with the second flow passage.

2. The heat management apparatus according to claim 1, wherein a first opening is formed on the first wall, the first opening is in communication with the second flow passage, a second opening is formed on the second wall, the second opening is in communication with the third flow passage, the first opening and the second opening are arranged opposite to each other or staggered, and the first opening is in communication with the second opening;

the first heat exchange portion comprises a first plate body, and the second heat exchange portion comprises a second plate body, and the plurality of plates are located between the first plate body and the second plate body along a stacking direction of the plurality of plates; the third flow passage comprises a first hole passage, the throttle unit comprises a first valve body, the first valve body has a third opening on a bottom wall of the first valve body, the first valve body is fixed to the second plate body, the second plate body has a fourth opening, at least part of the fourth opening is arranged opposite to the first hole passage, and at least part of the fourth opening is arranged opposite to the third opening; and the refrigerant flow passage further comprises a fourth flow passage, one end of the fourth flow passage is in communication with the first flow passage, and the other end of the fourth flow passage is in communication with the valve port.

3. The heat management apparatus according to claim 2, wherein the heat management apparatus comprises a connecting plate body, the connecting plate body comprises a first through hole and a second through hole, the first opening is arranged opposite to at least part of the second through hole, the second opening is arranged opposite to at least part of the second through hole, and the first opening is in communication with the second opening through the second through hole; and a wall forming the fourth flow passage is sealed to a wall of the first through hole, the fourth flow passage is in communication with a chamber of the first through hole, the first wall has a first communication port, at least part of the first communication port is arranged opposite to the first through hole, at least part of the first communication port is arranged opposite to a second hole passage, and the first through hole is in communication with the second hole passage through the first communication port.

4. The heat management apparatus according to claim 2, wherein the second heat exchange portion comprises a plurality of first plates which is stacked; and each first plate comprises a first orifice, the heat management apparatus comprises a pipe body, the fourth flow passage comprises a chamber of the pipe body, a plurality of the first orifices form the first hole passage, at least part of the pipe body is located in the first hole passage, at least part of the pipe body is located between the valve port and the first wall along an axial direction of the first hole passage, and a first end portion of the pipe body is relatively fixed to the valve port portion, the chamber of the pipe body is in communication with the valve port, and a second end portion of the pipe body is matched with the first through hole; the second heat exchange portion comprises a first separation plate, the first separation plate and one plate of the second heat exchange portion have an integral structure, the first separation plate forms a bottom wall of the first hole passage along the axial direction of the first hole passage, the first separation plate has an opening for accommodating the pipe body, and a wall forming the opening of the first separation plate is sealed to a wall of the pipe body; or, each first plate comprises at least one first orifice and a second orifice, the second orifice is not in communication with the first orifice, a plurality of the second orifices form the fourth flow passage, and a plurality of the first orifices form the first hole passage; the valve port portion is sealed to a wall of the second orifice, and the wall of the second orifice matched with the valve port portion is close to the second plate body.

5. The heat management apparatus according to claim 4, wherein the heat management apparatus comprises the pipe body, at least part of the valve port portion is located in the first end portion of the pipe body and is sealedly fixed to an inner wall of the first end portion; or, the valve port portion comprises a communication chamber, the valve port is in communication with the communication chamber, the first end portion is accommodated in the communication chamber and is sealed to a wall forming the communication chamber;

or, the heat management apparatus further comprises a connecting portion, the connecting portion comprises an accommodating portion, at least part of the valve port portion is located in an accommodating chamber formed by the accommodating portion, and a side wall of the valve port portion is sealed to an inner wall of the accommodating portion; at least part of the accommodating portion is located in the first end portion and is sealedly fixed to a wall of the first end portion; or the first end portion is located in the accommodating chamber formed by the accommodating portion and is sealed to a wall of the accommodating portion.

6. The heat management apparatus according to claim 5, wherein the connecting portion further comprises a fixing portion and a communication portion, the fixing portion is fixed to the first valve body and/or the second plate body, the communication portion is located between the accommodating portion and the fixing portion along a radial direction of the first hole passage, the throttle unit comprises a valve chamber, a wall forming the valve chamber comprises a wall of the first valve body and a wall of the connecting portion, the valve chamber is located on one side of the communication portion, the first hole passage is located on another opposite side of the communication portion, and the valve chamber is in communication with the first hole passage through the communication portion.

7. The heat management apparatus according to claim 6, wherein the heat management apparatus comprises a support ring, the first valve body comprises a first penetrating hole, the valve port portion is located in a chamber formed by the first penetrating hole, a wall of the first penetrating hole comprises a step surface abutting against the fixing portion, one end of the support ring supports the fixing portion on the step surface, and the support ring is threadedly connected with the first penetrating hole.

8. The heat management apparatus according to claim 4, wherein each first plate comprises four first orifices which are defined on a circumferential side of the second orifice, the first plate comprises a first flange, the first flange is folded from a main body of the first plate to the first valve body, the first flange is inserted into an adjacent first flange and is sealedly fixed to the adjacent first flange, and a first flange adjacent to the connecting portion is sealedly connected to a wall of the valve port portion.

9. The heat management apparatus according to claim 2, wherein the heat management apparatus comprises a first transition passage and a second transition passage, the first transition passage is formed in the first valve body, the second transition passage is located at one end of the second hole passage and is in communication with the second hole passage, a wall of the first transition passage is matched with the first end portion of the pipe body, and a wall of the second transition passage is matched with the second end portion of the pipe body, and at least part of the pipe body is arranged outside the heat exchange core body.

10. The heat management apparatus according to claim 9, wherein the pipe body comprises a main body portion, the first end portion of the pipe body is sealed to the wall of the first transition passage, the second end portion of the pipe body is sealed to the wall of the second transition passage; at least one bending portion is provided between the first end portion of the pipe body and the main body portion, and at least one bending portion is provided between the second end portion of the pipe body and the main body portion, the main body portion is substantially parallel to a side wall of the heat exchange core body, and a gap is formed between the main body portion and the side wall of the heat exchange core body.

11. The heat management apparatus according to claim 10, wherein the heat management apparatus comprises a connecting plate body, the connecting plate body is located between the first heat exchange portion and the second heat exchange portion along the axial direction of the first hole passage, the connecting plate body comprises a first through hole, a chamber of the first through hole comprises the second transition passage, the second transition passage has an opening, in communication with the second hole passage, on a first connecting wall of the connecting plate body, the first connecting wall is fixed to the first heat exchange portion, and the second transition passage has an opening on a second connecting wall of the connecting plate body; or, the second transition passage is formed in the first plate body, the second transition passage has an opening, facing the second hole passage, on an upper wall of the first plate body, the second transition passage has at least a first connecting port in the first plate body, and a wall of the first connecting port is sealed to the second end portion of the pipe body.

12. The heat management apparatus according to claim 1, wherein the heat management apparatus comprises a first inlet, a second inlet, a first outlet and a second outlet; the third flow passage comprises a first hole passage, a sixth hole passage and a first inter-plate passage of the second heat exchange portion, the first hole passage is in communication with the sixth hole passage through the first inter-plate passage of the second heat exchange portion; the second flow passage comprises a third hole passage, a fourth hole passage and a second inter-plate passage of the first heat exchange portion, the third hole passage is in communication with the fourth hole passage through the first inter-plate passage of the first heat exchange portion, and first outlet is in communication with the fourth hole passage; the first flow passage comprises a fifth hole passage, a second hole passage and a first inter-plate passage of the first heat exchange portion, the fifth hole passage is in communication with the second hole passage through the second inter-plate passage of the first heat exchange portion, and the first inlet is in communication with the fifth hole passage; the coolant flow passage comprises a seventh hole passage, an eighth hole passage and a second inter-plate passage of the second heat exchange portion, the seventh hole passage is in communication with the eighth hole passage through the second inter-plate passage of the second heat exchange portion, the second inlet is in communication with the seventh hole passage, and the second outlet is in communication with the eighth hole passage;

along a stacking direction of the plurality of plates, the first outlet and the first inlet are located on one side of the heat management apparatus, and the second outlet and the second inlet are located on another opposite side of the heat management apparatus; and the first inter-plate passage and the second inter-plate passage of the first heat exchange portion are each formed between two of the plurality of plates of the first heat exchange portion and alternately arranged along the stacking direction of the plurality of plates of the first heat exchange portion, and the first inter-plate passage and the second inter-plate passage of the second heat exchange portion are each formed between two of the plurality of plates of the second heat exchange portion and alternately arranged along the stacking direction of the plurality of plates of the second heat exchange portion.

13. The heat management apparatus according to claim 12, wherein the heat management apparatus further comprises a third outlet and a third inlet, the third outlet is in communication with the second hole passage, the third inlet is in communication with the fourth hole passage; and the first outlet, the first inlet, the third outlet and the third inlet are located on a same side of the heat management apparatus.

14. A heat management system, comprising a heat management apparatus, a compressor and a condenser, wherein the heat management apparatus is the heat management apparatus according to claim 1, the heat management apparatus comprises a first inlet, a first outlet, a second outlet and a second inlet, an outlet of the compressor is in communication with the first inlet through the condenser, the first outlet is in communication with an inlet of the compressor, the heat management system further comprises a first heat exchanger and a pump, the second outlet of the heat management apparatus is in communication with the second inlet through the first heat exchanger and the pump.

15. The heat management system according to claim 14, wherein the heat management apparatus further comprises a third inlet and a third outlet, the heat management system comprises an evaporator and a throttle element, the third outlet is in communication with the third inlet through the throttle element and the evaporator.

16. The heat management apparatus according to claim 1, wherein in a direction of flow of refrigerant, the first flow passage is located upstream of the throttle unit and the third flow passage and the second flow passage are located downstream of the throttle unit.

\* \* \* \* \*